United States Patent
Motta et al.

(10) Patent No.: US 11,392,849 B2
(45) Date of Patent: Jul. 19, 2022

(54) SYSTEM-BASED EXTENSION OF QEOM ALGORITHM FOR QUANTUM COMPUTATION OF EXCITED-STATE PROPERTIES

(71) Applicants: International Business Machines Corporation, Armonk, NY (US); JSR Corporation, Tokyo (JP)

(72) Inventors: Mario Motta, San Jose, CA (US); Pauline Ollitrault, Zurich (CH); Stephen Wood, Thornwood, NY (US); Panagiotis Barkoutsos, Zurich (CH); Joseph Latone, San Francisco, CA (US); Ivano Tavernelli, Zurich (CH); Gavin Jones, San Jose, CA (US); Edward Pyzer-Knapp, Cheshire (GB); Yuya Onishi, Shinagawa Ward (JP)

(73) Assignees: INTERNATIONAL BUSINESS MACHINES CORPORATION, Armonk, NY (US); JSR CORPORATION, Tokyo (JP)

( * ) Notice: Subject to any disclaimer, the term of this patent is extended or adjusted under 35 U.S.C. 154(b) by 107 days.

(21) Appl. No.: 17/024,909

(22) Filed: Sep. 18, 2020

(65) Prior Publication Data
US 2022/0092458 A1    Mar. 24, 2022

(51) Int. Cl.
G06N 10/00 (2022.01)
G06F 17/16 (2006.01)

(52) U.S. Cl.
CPC ............ *G06N 10/00* (2019.01); *G06F 17/16* (2013.01)

(58) Field of Classification Search
CPC ................................ G06N 10/00; G06F 17/16
USPC .......................................................... 708/520
See application file for complete search history.

(56) References Cited

U.S. PATENT DOCUMENTS

| | | | |
|---|---|---|---|
| 7,529,717 B2 | 5/2009 | Vala et al. | |
| 9,819,347 B2 | 11/2017 | Hastings et al. | |
| 10,007,884 B2 | 6/2018 | Alboszta et al. | |
| 11,144,689 B1 * | 10/2021 | Cowtan | G06N 10/00 |

(Continued)

FOREIGN PATENT DOCUMENTS

| | | |
|---|---|---|
| WO | 2020053054 A1 | 3/2020 |
| WO | 2020120139 A1 | 6/2020 |

OTHER PUBLICATIONS

Ollitrault et al., "Quantum equation of motion for computing molecular excitation energies on a noisy quantum processor" arXiv: 1910.12890 (2019) 16 pages.

(Continued)

*Primary Examiner* — Tan V Mai
(74) *Attorney, Agent, or Firm* — Amin, Turocy & Watson, LLP

(57) ABSTRACT

Systems and methods that facilitate motion formalism utilizing quantum computing, to compute matrix operators in terms of commutators between qubit operators and measurements on the quantum hardware, wherein the commutators are computed utilizing symbolic calculus. Embodiments reduce computational cost of generalized eigenvalue synthesis relying on symbolic calculus and parallelization. Embodiments disclosed herein can also develop estimators of excited-states properties, considering constants of motion (e.g. spin) and non-constants of motions (e.g. dipoles, density matrices).

23 Claims, 11 Drawing Sheets

(56) References Cited

U.S. PATENT DOCUMENTS

| | | |
|---|---|---|
| 2011/0313741 A1 | 12/2011 | Langhoff |
| 2016/0283857 A1 | 9/2016 | Babbush et al. |
| 2018/0053112 A1 | 2/2018 | Bravyi et al. |
| 2018/0240035 A1 | 8/2018 | Scheer et al. |
| 2018/0267933 A1 | 9/2018 | Lanting |
| 2020/0193319 A1* | 6/2020 | Chen ................. G06F 17/16 |
| 2020/0311589 A1* | 10/2020 | Ollitrault ............. G06F 15/16 |
| 2022/0019931 A1* | 1/2022 | Jiang ................. G06F 17/16 |

OTHER PUBLICATIONS

Aleksandrowicz et al., IBM Research (Quantum) "Qiskit: An Open-source Framework for Quantum Computing" https://zenodo.org/record/2562111#.XhA8qi2ZPyl (2019).

G. Wick "The Evaluation of the Collision Matrix" Phys. Rev. 80 (2) 268-272 (1950) 5 pages.

A. L. Fetter and J. D. Walecka, Quantum theory of many-particle systems (Dover, 2003).

Molinari et al., "Notes on Wick's Theorem in Many-Body Theory" arXiv:1710.09248 (2017) 6 pages.

International Search Report and Written Opinion received for PCT Application Serial No. PCT/EP2019/082773 dated Mar. 11, 2020, 16 pages.

Ganzhorn, M., et al. "Gate-efficient simulation of molecular eigenstates on a quantum computer." arXiv: 1809.05057. Sep. 13, 2018. 20 pages.

Bravyi, Sergey, et al. "Tapering off qubits to simulate fermionic Hamiltonians." arXiv: 1701.08213. Jan. 31, 2017. 15 pages.

Mell, Peter, et al. "The NIST Definition of Cloud Computing." National Institute of Standards and Technology. Sep. 2011. 7 pages.

U.S. Appl. No. 16/369,885 "Calculating Excited State Properties of a Molecular System Using a Hybrid Classical-quantum Computing System" filed Mar. 29, 2019. (49 pages).

* cited by examiner

SYSTEM-BASED EXTENSION OF QEOM ALGORITHM FOR QUANTUM COMPUTATION OF EXCITED-STATE PROPERTIES

TECHNICAL FIELD

The subject disclosure relates to the motion formalism utilizing quantum computing, and more specifically, to compute matrix operators in terms of commutators between qubit operators and measurements on quantum hardware, wherein the commutators are computed utilizing symbolic calculus.

BACKGROUND

Quantum computing is generally use of quantum-mechanical phenomena to perform computing and information processing functions. Quantum computing can be viewed in contrast to classical computing, which generally operates on binary values with transistors. That is, while classical computers can operate on two basis states that are either 0 or 1, quantum computers operate on quantum bits that comprise superposition of both 0 and 1, can entangle multiple quantum bits, and use interference. Quantum computing is emerging as a new paradigm to solve a wide class of problems that show unfavorable scaling on a conventional classical high-performance computer. In particular, solving quantum chemistry and quantum physics problems using classical algorithms is hampered by exponential growth of resources (e.g., classical processors and memory) as a function of number of molecular basis functions encoded in a Hamiltonian system. A quantum system consists of many states typically having access to ground state. It is significant to find excited states of Hamiltonian operators for quantum computers and a quantum equation-of-motion (qEOM) algorithm which is recently introduced to determine excited states energies.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products facilitate generation of efficient artificial intelligence to determine an interaction between drugs and the brain using a brain measure and a brain model.

In accordance with an embodiment, a system, comprises a classical processor, operatively coupled to a memory, that executes the following computer executable components: a mapping component that maps Hamiltonian and pairs of excitation operators and respective adjoints to qubit operators to facilitate measurement on quantum hardware; and a computation component that computes matrix operators in terms of commutators between the qubit operators and the facilitated measurements on the quantum hardware, wherein the commutators are computed utilizing symbolic calculus.

In an optional aspect, the mapping component maps the computed commutator onto a first qubit operator.

In an optional aspect, the computation component computes the matrix operators to define matrices: M, Q, V, and W that are parallelized across two or more computer processing units (CPUs).

In accordance with an embodiment, a computer implemented method, comprises: using a classical processor, operatively coupled to a memory, to execute computer executable components to perform the following acts: using the classical processor to map Hamiltonian and pairs of excitation operators and respective adjoints to qubit operators to facilitate measurement on quantum hardware. Then the matrix operators are computed in terms of commutators between the qubit operators and the facilitated measurements on the quantum hardware, wherein the commutators are computed utilizing symbolic calculus. The quantum hardware simulation is used to measure the essential properties of the energy and constant-of-motion over the excited state. This is cross-processed classically such that the excited state is attached to energy, constant of motion, and a representation through an excitation operator.

In an optional aspect, the computer implemented method further comprises mapping, by the system, the computed commutator onto a first qubit operator.

In another optional aspect, the computer implemented method further comprises computing, by the system, the matrix operators to define matrices: M, Q, V, and W that are parallelized across two or more computer processing units (CPUs).

DETAILED DESCRIPTION

Figure 1:
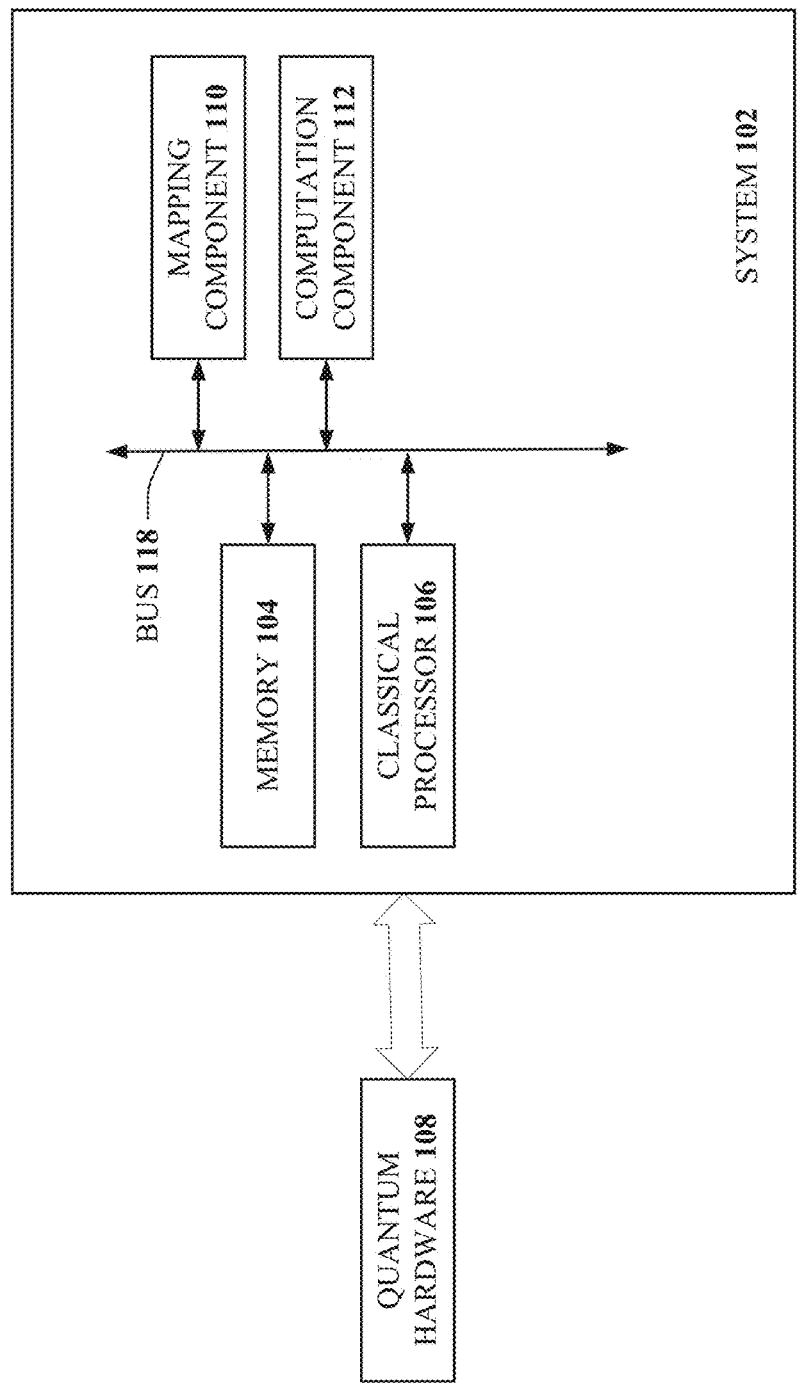
FIG. 1 illustrates a block diagram of an example system implementation that facilitates quantum equation of motion formalism utilizing algorithmic extension and efficient implementation by symbolic calculus.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

The subject disclosure relates generally to systems and methods that use a quantum equation of motion (qEOM) formalism utilizing algorithmic extension and efficient implementation by symbolic calculus to improve the qEOM algorithm. This can reduce computational cost of generalized eigenvalue synthesis relying on symbolic calculus and parallelization. Embodiments disclosed herein can also develop estimators of excited-states properties, considering constants of motion (e.g. spin) and non-constants of motions (e.g. dipoles, density matrices). Knowledge of these properties facilitates understanding and quantitatively describing significant phenomena (e.g. singlet-triplet excitations, electronic states of fragments in the dissociation of a molecule).

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle + \beta|1\rangle$ where $\alpha$ and $\beta$ are complex scalars such that $|\alpha|^2+|\beta|^2=1$), allowing a number of qubits to theoretically hold exponentially more information than a same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states for example: 63 percent 0 and 37 percent 1. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description nor the target machine instructions, but something in between. Compilers may use several IRs during a process of translating and optimizing a program. The input is source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

By processing information using laws of quantum mechanics, quantum computers offer novel ways to perform computation tasks such as molecular calculations, financial risk calculations, optimization and many more. There are many algorithms that are introduced to perform such computational tasks in an efficient manner. For instance, a Variational Quantum Eigensolver (VQE) algorithm was proposed for efficient approximation of electronic structure in near-term quantum computers. This algorithm is based on a parametrization of trial ground state wave functions. The VQE has already been successfully applied to simulation of ground state properties of simple molecular systems on quantum hardware and extended to more complex molecules in quantum simulators. Calculation of molecular excited state properties constitutes an additional challenge for both classical and quantum electronic structure algorithms. In fact, in addition to calculating a well-converged ground state wave function, one needs to devise schemes for evaluation of higher energy states, which in general are not accessible through optimization of a trial state. In classical computing, excited states are typically computed in linear response theory, explicitly (LR) or implicitly (e.g., equation of motion, EOM) starting from a ground state wave function optimized at a given level of theory (e.g., CC, multi-configurational self-consistent field, configuration interaction, etc). A qEOM algorithm provides connection between equilibrium stage and excited stage in a quantum system. In order to make this connection possible, certain measurements should be performed and properties extracted on ground state in quantum hardware and to cross-process this information in a classical computer. However, processing such information in this manner can be time-consuming and result in limited information about additional properties of a system. Hence, embodiments described and claimed herein provide a unique methodology to improve the qEOM algorithm and reduce computation cost of generalized eigenvalue synthesis relying on symbolic calculus and parallelization. Also, estimators of excited-states properties are developed, considering constants of motion (e.g., spin) and non-constants of motions (e.g., dipoles, density matrices) as these properties are needed to understand and quantitatively describe significant phenomena (e.g., singlet-triplet excitations, electronic states of fragments in dissociation of a molecule . . . ).

FIG. 1 illustrates a block diagram of an example system 100 that can access data and process that data using variable computing components depicted in accordance with one or more embodiments described herein. The system 100 can facilitate a process of assessing and identifying large amounts of various forms of data, using machine learning, and training a neural network or other type of model. The system 100 can also generate predictive recommendations to an individual level with context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform operations described herein. Repetitive description of like elements employed in one or more embodiments described herein is omitted for sake of brevity.

The system 100 facilitates a quantum equation of motion (qEOM) formalism utilizing algorithmic extension and efficient implementation by symbolic calculus to improve a qEOM algorithm. This can reduce algorithm processing time and result in more information, as compared to conventional techniques, about excited state which facilitates obtaining complete or near-complete characterizations for a variety of computations.

System 100 can optionally include a server device, one or more networks and one or more devices (not shown). The system 100 can also include or otherwise be associated with at least one classical processor 106, operatively coupled to memory 104 that executes computer executable components. The system 100 can further include a system bus 118 that can operatively couple various components including, but not limited to, a mapping component 110 that maps Hamiltonian and pairs of excitation operators and respective adjoints to qubit operators to facilitate measurement on quantum hardware. The computation component 112 computes matrix operators in terms of commutators between qubit operators and measurements on the quantum hardware 108, wherein the commutators are computed utilizing symbolic calculus.

In an implementation, the mapping component 110 maps Hamiltonian and pairs of excitation operators and respective adjoints to qubit operators to facilitate measurement on quantum hardware. Mapping component 110 maps the computed commutator onto a first qubit operator. The computation component 112 computes matrix operators in terms of commutators between qubit operators and measurements on the quantum hardware 108, wherein the commutators are computed utilizing symbolic calculus. Computation component 112 computes the matrix operators to define matrices: M, Q, V, and W that are parallelized across two or more computer processing units (CPUs). Through this technique, computational costs of operators are reduced and characterization of excited state and transition properties (e.g., spin squared, densities, and multipoles) can become readily available.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

The EOM approach was extensively reviewed and implemented in a series of electronic structure packages. Within this approach, excited states $|n\rangle$ are generated by applying an excitation operator of the general form $\hat{O}^\dagger_n = |n\rangle\langle 0|$ to the ground state $|0\rangle$ of the system, where $|n\rangle$ is the shorthand notation for the n-th excited state of the electronic structure Hamiltonian. Similarly, a de-excitation operator can be written as $\hat{O}_n = |0\rangle\langle n|$. Taking a commutator of Hamiltonian and th excitation operator leads to an expression for excitation energies, $E_{0n} = E_n - E_0$:

$$[\hat{H}, \hat{O}_n^\dagger]|0\rangle = \hat{H}\hat{O}_n^\dagger|0\rangle - \hat{O}_n^\dagger\hat{H}|0\rangle = E_{0n}\hat{O}_n^\dagger|0\rangle$$

Operating from the left-hand side with $\hat{O}_n = |0\rangle\langle n|$ obtains:

$$E_{0n} = \frac{\langle 0|[\hat{O}_n, [\hat{H}, \hat{O}_n^\dagger]]|0\rangle}{\langle 0|[\hat{O}_n, \hat{O}_n^\dagger]|0\rangle} = \frac{\langle 0|[\hat{O}_n, \hat{H}, \hat{O}_n^\dagger]|0\rangle}{\langle 0|[\hat{O}_n, \hat{O}_n^\dagger]|0\rangle}$$

The EOM approach aims at finding approximate solutions to the above equation by expressing $\hat{O}_n^\dagger$ as a linear combination of basis excitation operators with variable expansion coefficients. Excitation energies are then obtained through minimization of the equation above in coefficient space. A qEOM algorithm calculates excited states of molecules and is more resistant to computational noise. This algorithm calculates energy difference between excited states and ground state. This algorithm is an extension of a Variational Quantum Eigensolver (VQE) algorithm that was proposed for efficient approximation of electronic structure in near-term quantum computers. This algorithm is based on a parametrization of trial ground state wave functions. Parameters are encoded in single-qubit and two-qubit gate angles and are optimized self-consistently, using a classical processor, until minimum ground state energy is reached. Energy corresponding to a given set of parameters is obtained by computing an expectation value of a system Hamiltonian and becomes therefore a function of gate variables. However, qEOM may not require any modification of a quantum circuit for a ground state wave function, but rather measurement of additional excitation operator's expectation values. Thus, finding excited states of Hamiltonian operators is a significant application for quantum computers. There are a variety of algorithms to address this problem on a contemporary quantum hardware, including a hybrid quantum-classical variation approach and recently introduced quantum equation-of-motion (qEOM) algorithm.

The qEOM is based on formulation and solution of a generalized eigenvalue problem to determine excited-states energies, of the form:

$$\begin{pmatrix} \tilde{M} & \tilde{Q} \\ \tilde{Q}^* & \tilde{M}^* \end{pmatrix} c = \Delta X \begin{pmatrix} V & W \\ -W^* & -V^* \end{pmatrix} c$$

wherein $\tilde{M}_{ij} = \langle \psi | [E_i^+, X, E_j] | \psi \rangle$, $\tilde{Q}_{ij} = -\langle \psi | [E_i^+, X, E_j^+] | \psi \rangle$, $V_{ij} = \langle \psi | [E_i^+, E_j] | \psi \rangle$, $W_{ij} = -\langle | [E_i^+, E_j^+] | \psi \psi \rangle$ H is a Hamiltonian of a system, ψ is an approximation for ground state of the system (e.g., obtained in a preliminary calculation) and $\{E_i\}_i$ are excitation operators typically involving 1- and 2-particle transitions from occupied to virtual orbitals in a mean-field reference. The qEOM provides connection between equilibrium state and excited state. To make this connection, certain measurements are conducted and ground state properties are extracted on quantum hardware. This information is then processed in a classical computer. Essentially, information that is obtained from the quantum hardware $M_{ij}$, $V_{ij}$, $Q_{ij}$, and $W_{ij}$ are post processing matrices as stated above. In previous embodiments, qEOM was applied to computer excitation energies of small systems (order 2-6 qubits) owing to high computational cost of synthesis of M, Q, V, W operators. In addition, a characterization of excited-state and transition properties (e.g., spin squared, densities, and multipoles) are not available. Prior art that introduced certain qEOM methodology focused on excited-states energies of electron and phonon systems, but have so far have been limited by high computational time connected with synthesis of the qEOM generalized eigenvalue problem and information that is obtained from an excited state is limited. This is a drawback that limits practicality and widespread diffusion of qEOM. Thus, novel embodiments disclosed and claimed herein generate M, V, Q, and W operators at a faster rate than conventional techniques, which can reduce computational cost of generalized eigenvalue synthesis by utilizing symbolic calculus and parallelization. In addition, estimators of excited-states properties are developed considering constants of motion (e.g., spin) and non-constants of motions (e.g., dipoles, density matrices). Knowledge of these properties substantially facilitates understanding and quantitatively describing significant phenomena (e.g., singlet-triplet excitations, electronic states of fragments in the dissociation of a molecule . . . ). The developed formalism is implemented, and numerical examples are provided, to support feasibility of these embodiments.

Figure 2:
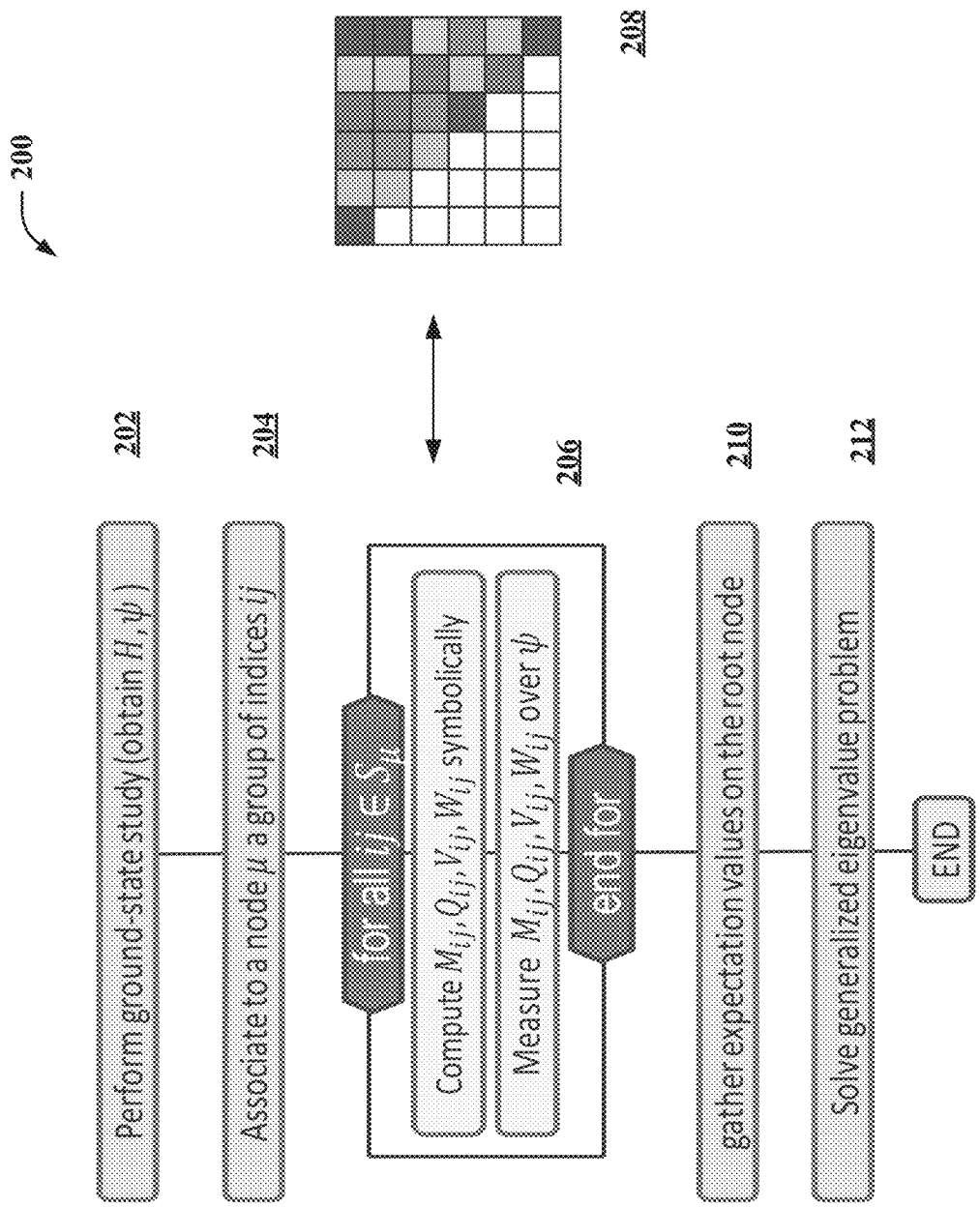
FIG. 2 illustrates an example flowchart of an efficient proposed algorithm and parallelization strategy.

FIG. 2 illustrates an example flowchart of an efficiently proposed algorithm and parallelization strategy. An aspect that is significant in order to obtain a fast calculation (as compared to conventional techniques) is that in qEOM, certain tasks of fixed nature would need to be repeated several times and if a task has to be repeated multiple times serially then execution can time can increase. Thus, the flowchart shown at 200 describes methodologies in accordance with embodiments to illustrate acceleration of computation process in qEOM. The qEOM is computed by performing ground-state study (obtain H, ψ) at 202. Upon ground-state study, a node μ is associated to a group of indices ij at 204. Parallelization occurs wherein for ij ∈ Sμ, $M_{ij}$, $Q_{ij}$, $W_{ij}$ is computed symbolically, and $M_{ij}$, $Q_{ij}$, $V_{ij}$, $W_{ij}$ over is measured as denoted at 206. Upon completion of parallelization, expectation values on a root node is gathered at 210 and thus a generalized eigenvalue problem is solved at 212. If there are several computational platforms that are able to carry out similar tasks at the same time and return results, then acceleration is obtained in the computation. A described at 208, a restricted set of matrix elements is evaluated (shaded boxes), leveraging symmetries of M, Q, V, W. Parallelization over cores aims to balance workload of a node. Thus, in addition to symbolic calculus, to accelerate qEOM, a naïve parallelization approach is employed to ensure that identical tasks are not executed one after another but distributed across N computing nodes (wherein N is an integer greater than 1) and are carried out at the same time.

Figure 3:
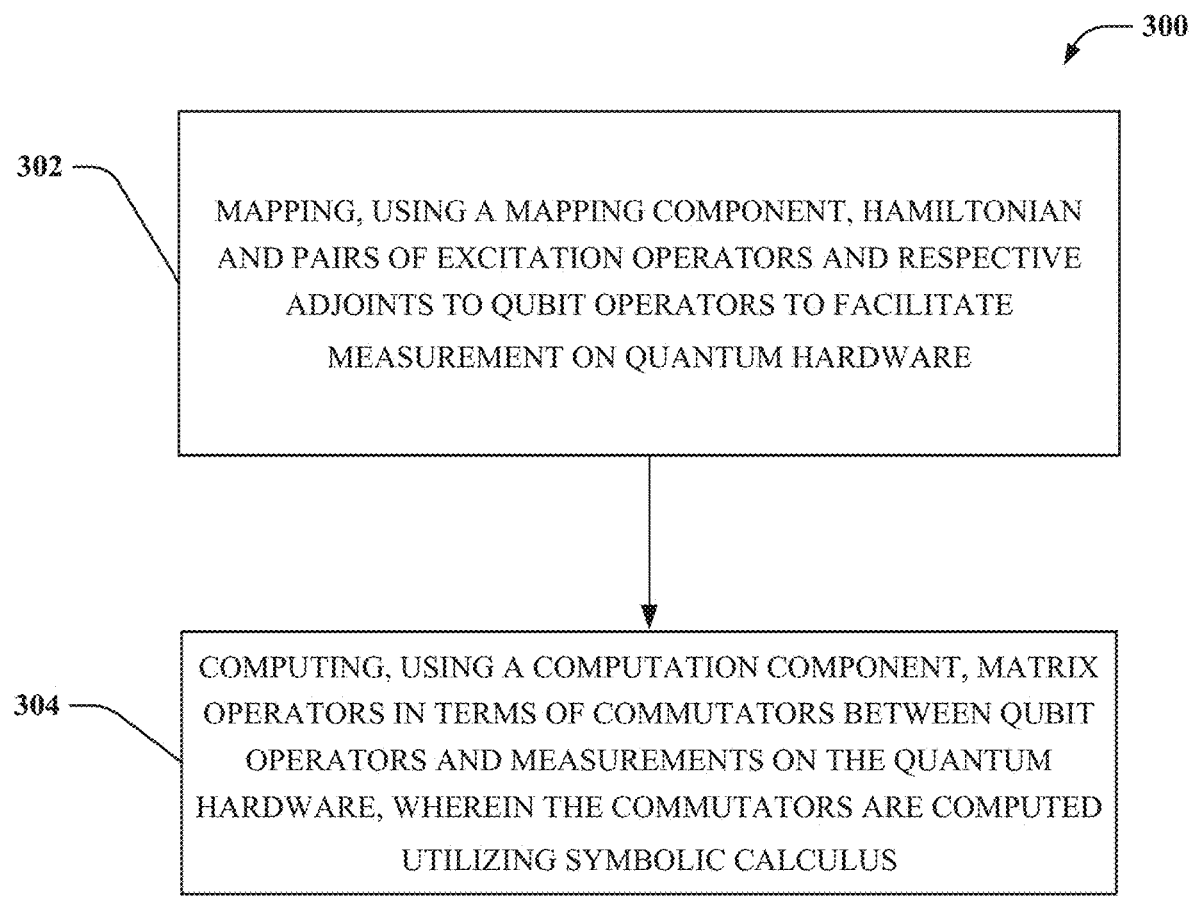
FIG. 3 illustrates an example flowchart of a quantum equation of motion formalism to compute matrix operators in terms of commutators between qubit operators and measurements on quantum hardware, wherein the commutators are computed utilizing symbolic calculus.

FIG. 3 illustrates an example flowchart of a quantum equation of motion (qEOM) formalism to compute matrix operators in terms of commutators between qubit operators and measurements on quantum hardware, wherein the commutators are computed utilizing symbolic calculus. In the current qEOM algorithm, a Hamiltonian and pairs of excitation operators and adjoints are mapped onto qubit operators to enable measurement of quantum hardware. Operators defining matrices M, Q, V, and W are then computed in terms of commutators between qubit operators and measured on a quantum hardware. Conventionally, this makes the qEOM algorithm time consuming because certain operators have to compose in specific forms prior to computation. There are specific operations that have been performed before the qEOM quantities can be converted to quantities that can be measured directly on a quantum hardware. These operations are usually carried out in numerical sections which makes such process very slow. However, if these mathematical manipulations can be performed by symbolic actions in accordance with novel embodiments disclosed and claimed herein, then the amount of time required to carry these operations can be reduced significantly. As denoted by block 300, embodiments compute commutators by symbolic calculus, using a numeric implementation of Wick's theorem and keep track of sparsity of resulting operators. By using a mapping component, the Hamiltonian and pairs of excitation operators and respective adjoints are mapped to qubit operators to facilitate measurement on the quantum hardware as denoted by block 302. A computation component computes matrix operators in terms of commutators between qubit operators and measurements on the quantum hardware, wherein the commutators are computed utilizing symbolic calculus as denoted by block 304. A Wick's theorem reduces products of high-order creation and annihilation operators to sums of products of pairs of these operators.

Figure 4:
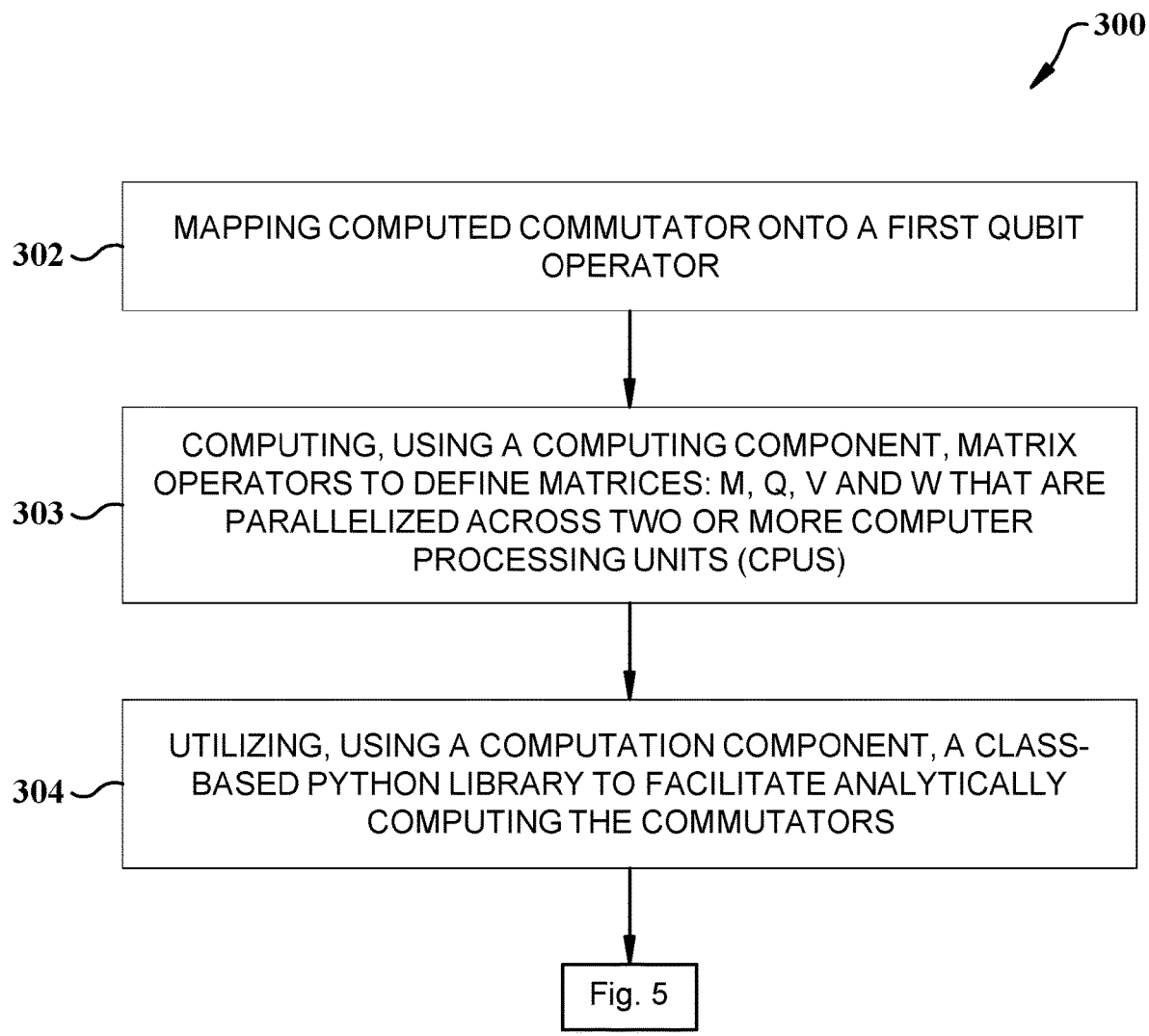
FIG. 4 illustrates an example flow chart of analytically computing commutators based on a python library.

FIG. 4 illustrates an example flow chart of a methodology 400 for analytically computing commutators based on a python library. Once a commutator is computed, it is mapped onto a qubit operator, leveraging its sparsity to further improve efficiency of the procedure as denoted by block 402. Calculation of matrix operators M, Q, V and W can be parallelized across two or more computer processing units (CPUs) in a very natural manner, involving limited communication as denoted by block 404. A computation component can utilize a class-based Python library to facilitate analytically computing commutators as denoted by block 406. In order to analytically compute commutators, the class-based Python library is composed.

Figure 5:
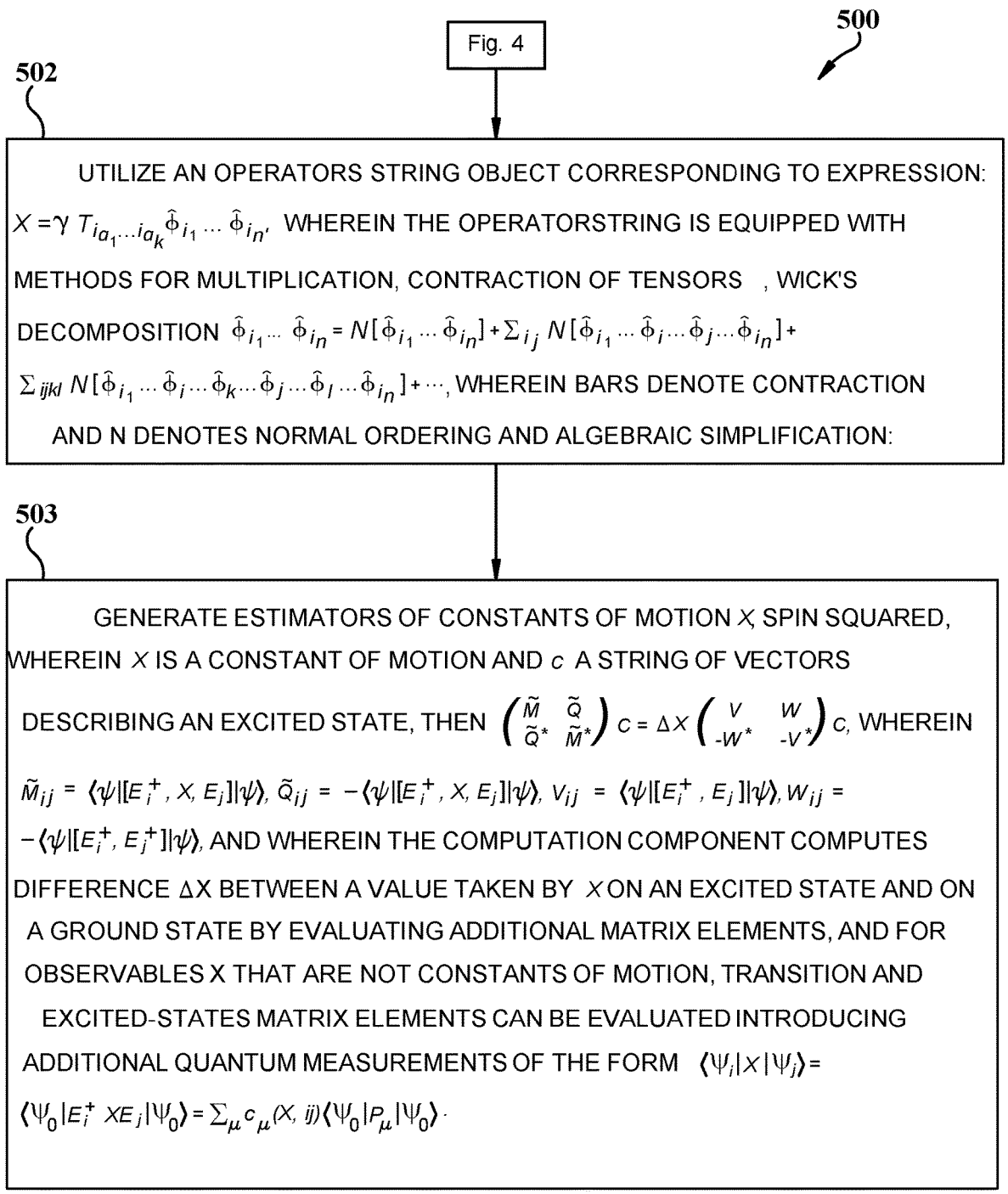
FIG. 5 illustrates an example flowchart of analytically computing commutators.

FIG. 5 continues the methodology 400 illustrating analytically computing commutators. In order to analytically compute commutators, a class-based Python library is composed as denoted by block 500. This is based on an OperatorString object, corresponding to the expression:

$$X = \gamma T_{i_{a_1} \cdots i_{a_k}} \hat{\phi}_{i_1} \cdots \hat{\phi}_{i_n}$$

wherein
γ is a scalar $$T_{i_{a_1} \cdots i_{a_k}}$$

$\hat{\phi}_{i_1} \cdots \hat{\phi}_{i_n}$ are fermionic creation and destruction operators
OperatorString is equipped with methods for multiplication, contraction of tensors T, Wick's decomposition:

$$\hat{\phi}_{i_1} \cdots \hat{\phi}_{i_{n-M}} \hat{\phi}_{i_1} \cdots \hat{\phi}_{i_n}] + \Sigma_{ij} N[\hat{\phi}_{i_1} \cdots \hat{\phi}_i \cdots \hat{\phi}_j \cdots \hat{\phi}_{i_n}] + \Sigma_{ijkl} N[\hat{\phi}_{i_1} \cdots \hat{\phi}_i \cdots \hat{\phi}_k \cdots \hat{\phi}_j \cdots \hat{\phi}_l \cdots \hat{\phi}_{i_n}] + \cdots$$

wherein bars denote contraction and N denotes normal ordering and algebraic simplification as denoted by block 502. These embodiments shift from algorithmic evaluations which are time consuming and require a computer to a calculation that is symbolic (e.g., pen and paper method). In a symbolic method, theorems such as Wick's theorem can be used and modified for purpose of qEOM to obtain acceleration. Prior to these embodiments, an efficient scheme for computing the qEOM generalized eigenvalue equation was absent. In theory, there are three kinds of properties to distinguish in a computation. First, energy is an essential property of a quantum system. It determines ground state (e.g., lowest energy) and excited states (e.g., higher energy). The energies of the excited state are used by qEOM. Second, property is a constant of motion wherein these properties have a special relationship with the energy of the system. It is well defined if and only if the energy is well defined wherein it applies to number of particles and speed (angular momentum). If there is constant of motion, then to measure value of the constant of motion on the excited state is essential. This can help replicate the qEOM procedure by replacing the operator that describes the energy with an operator that describes the constant of motion. This is significant as it is not through the energy but through these properties of the excited state that the characterization is performed. Lastly, non-constant of motion may not have a special relationship with energy. In the current qEOM algorithm, excited state energies are the only quantity computed. Hence, these embodiments propose to produce new estimators of constants of motion X such as the spin squared as denoted by block 504. To achieve this goal, if X is a constant of motion and c is a string of vectors described an excited state, then:

$$\begin{pmatrix} \tilde{M} & \tilde{Q} \\ \tilde{Q}^* & \tilde{M}^* \end{pmatrix} c = \Delta X \begin{pmatrix} V & W \\ -W^* & -V^* \end{pmatrix} c$$

wherein $\tilde{M}_{ij} = \langle \psi | [E_i^+, X, E_j] | \psi \rangle$, $\tilde{Q}_{ij} = -\langle \psi | [E_i^+, X, E_j^+] | \psi \rangle$, $V_{ij} = \langle \psi | [E_i^+, E_j] | \psi \rangle$, $W_{ij} = -\langle | [E_i^+, E_j^+] | \psi \psi \rangle$ A difference ΔX between value employed by X on an excited state and on ground state can be computed by evaluating additional matrix elements. Prior art had no techniques available to diagnose excited-states properties. Novel embodiments disclosed and claimed herein allow understanding physical properties of transition from ground to a target excited state. For observables X that are not constants of motion, transition and excited-states matrix elements can be evaluated introducing additional quantum measurements of the form:

$$\langle \Psi_i | X | \Psi_j \rangle = \langle \Psi_0 | E_i^+ X E_j | \Psi_0 \rangle = \sum_\mu c_\mu(X, ij) \langle \Psi_0 | P_\mu | \Psi_0 \rangle$$

Examples of properties that become accessible through this protocol are transition and excited-state one-body density matrices and dipole moments, significant for absorption spectra and Mulliken population analysis. A non-constant of motion such as electronic density is significant as it is a purely special property. Energy of a system is determined by speed and momentum velocity properties of electors however density determines where electrons are in a molecule. Essentially points of space that electrons occupy determine electric field that molecules generate and thus determines interaction with other molecules and external fields. Thus, even though non-constant of motion does not hold a special relationship with energy, it is valuable during qEOM evaluation. In order to evaluate non-constant of motion, a tool is required to measure on the hardware as nature of an operator changes significantly. Initially, an estimate of excited state is noted through first measurement and then information obtained from quantum hardware is used to cross-process by classical hardware to synthesize an operator that excites from a given ground state to a given excited state. Then the non-constant of motion that is required to be evaluated is multiplied with the excitation operators and measurement is obtained. Essentially, this type of modified interaction between quantum hardware and classical hardware wherein operators are measured with quantum hardware, cross-processed classically, excited states are obtained and synthesized are used in quantum hardware to measure the non-constant of motion over the excited states.

Figure 6:
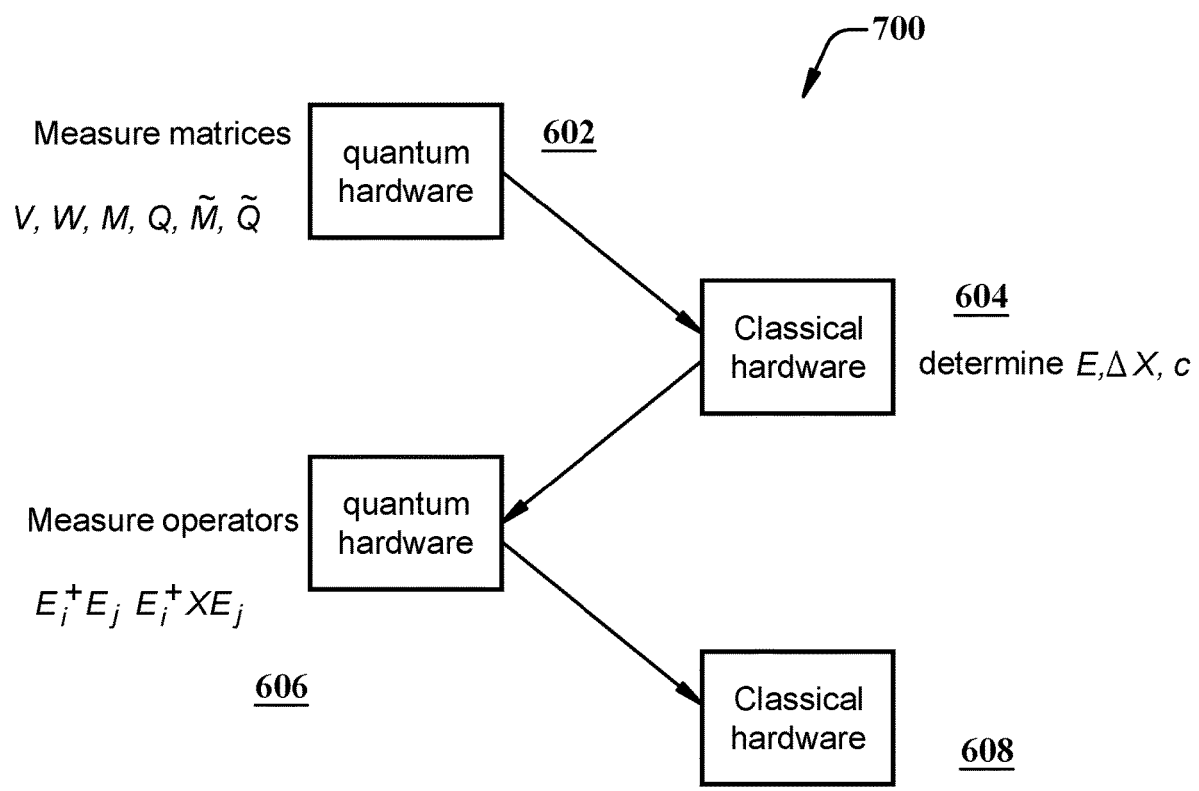
FIG. 6 illustrates an example to simulate excited states at reduced computational cost.

FIG. 6 illustrates an example to simulate excited states at a reduced computational cost. It is to be appreciated that there are many ways interaction between quantum hardware and classical hardware in qEOM calculations can be described and one such method is described in these embodiments. Evaluation of properties, constants of motion, and non-constants of motion alike, involves modifying and enriching interaction between a quantum computer (e.g., synthesis and evaluation of circuits) and a classical computer (e.g., post-processing of measurement outcomes and use of post-processed information to synthesize quantum circuits) as shown at 600. A process begins wherein properties of energy and constant of motion over an excited state (V, W, M, Q, $\tilde{M}$, $\tilde{Q}$) are measured on quantum hardware as shown at block 602. These matrices are classically cross-processed such that excited state has energy, constant of motion and representation through an excitation operator and thus determine E, ΔX, and c as shown at block 604. Then, the process 600 returns back to quantum hardware and uses the excitation operator to estimate known constant of motion properties such as measured operators $E_j^+ E_j E_i^+ X E_j$ as shown at block 606. Upon obtaining results of measurements, known constant of motion is cross-processed in classical hardware and correct quantities are obtained at block 608. A reduced density matrix (RDM) and non-constant of motion (non-COMs) transition are determined. The process is performed on classical hardware. Classical computers are electric circuits that are managed to execute certain tasks. Quantum hardware are electric circuits that operate in a different regime and are geared towards different operations. There is a translation of operations that is noted in symbols and letters into physical operations. The classical hardware can be for example a unique Qiskit product which is essentially a language that serves to coordinate both quantum and classical hardware. The quantum hardware can carry out some operations by writing down certain instructions and convert into electromagnetic pulses that are sent to the classical hardware. State of the qubit is manipulated and ensures the data is read out to the classical computer for cross processing. This is then sent back to the quantum hardware to measure non-constant of motion and sent back to the classical hardware for cross-processing. Thus, there is a time flow of feedback between the classical and quantum computers in a qEOM simulation of molecular properties wherein control is performed by classical hardware (e.g., Qiskit).

Figure 7A:
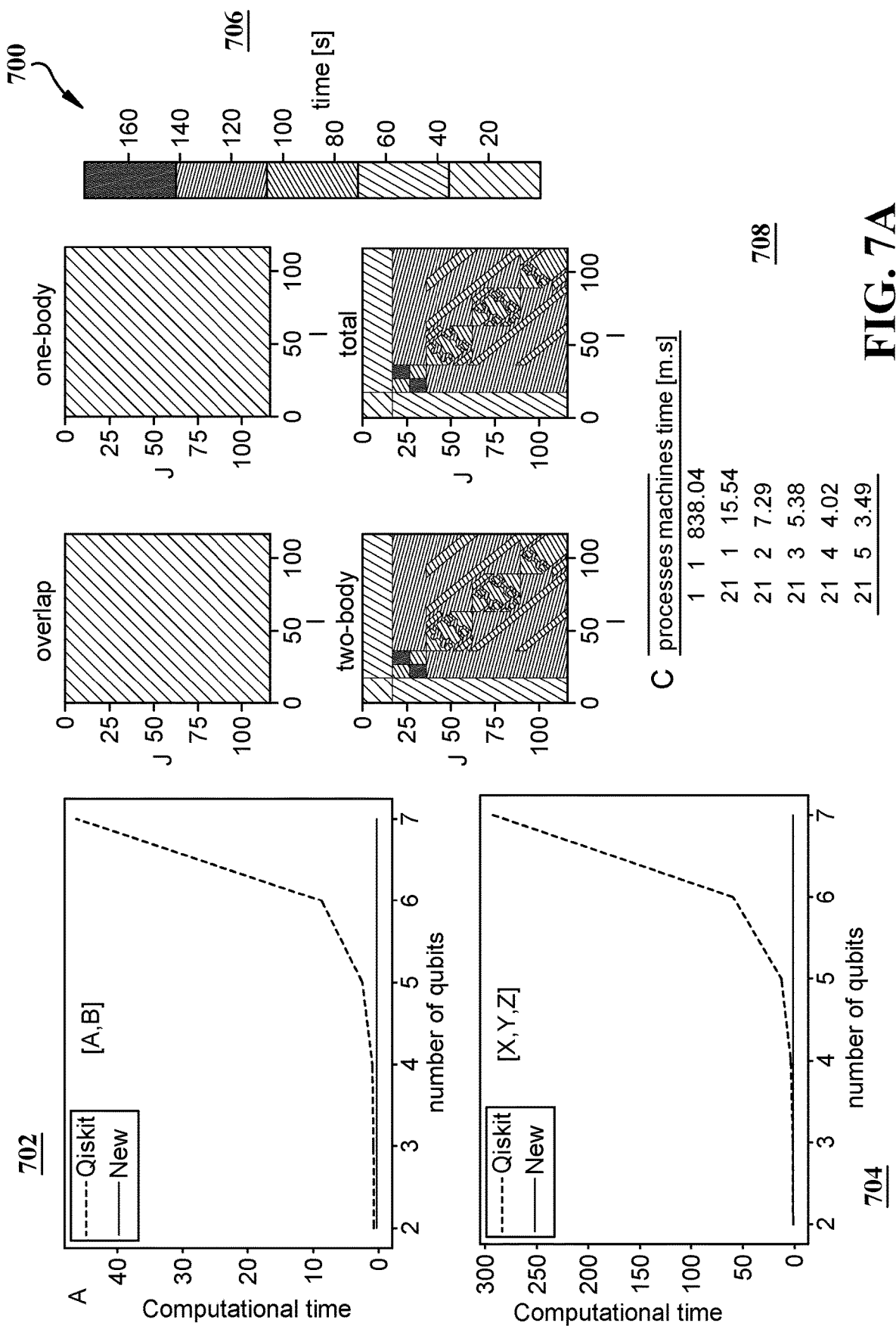
FIG. 7A illustrates an example of processed data upon implementation of an algorithm that highlights impact of symbolic evaluation and parallelization.

FIG. 7A illustrates an example of processed data upon implementation of an algorithm that highlights impact of symbolic evaluation and parallelization. Analytical results obtained in accordance with embodiments are shown at 700. Numerical experiments evince improvement over standard qEOM in performance and highlight impact of symbolic evaluation (panels A,B) and parallelization. Plots denoted by 702 and 704 denote time employed to evaluate commutators of the form [A, B] and [X,Y,Z] with A, X, Y, Z random one body-operators and B random two-body operator. Plots in 702 and 704 prove an acceleration concept wherein new speed is faster than an original qEOM speed. It is shown that the new speed curve is matched lower than a Qiskit curve for a section of number of qubits of quantum computation in this problem.

Numerical tests relative to a chain of 6 hydrogen atoms with an STO-6G basis (10-qubit problem) are depicted by blocks 706 and 708. Time taken to evaluate a qEOM matrix element (top left for V, W operators; top right for the contribution to Q,M from the one-body part of H; bottom left for the contribution to Q, M from the two-body part of H; bottom right for the total of all the times) are shown by block 706, which facilitates identifying bottlenecks and cause of occurrence. This is a 10-qubit problem carried out with Qiskit in a combination of symbolic evaluation and parallel computing. There is an existing issue with contemporary hardware simulators and embodiments aim to tackle this problem by increasing acceleration. A table as shown at 708 illustrate impact of parallelization on total execution time of qEOM for a chain of 4 hydrogen atoms with an STO-6G basis. There are a certain number of processes divided across several machines. As number of processes increases, work is performed in parallel such that execution time collapses from 838 minutes to 4 minutes. Thus, the numerical experiments clearly evidence improvement over standard qEOM in performance and highlight impact of symbolic evaluation and parallelization.

Figure 7B:
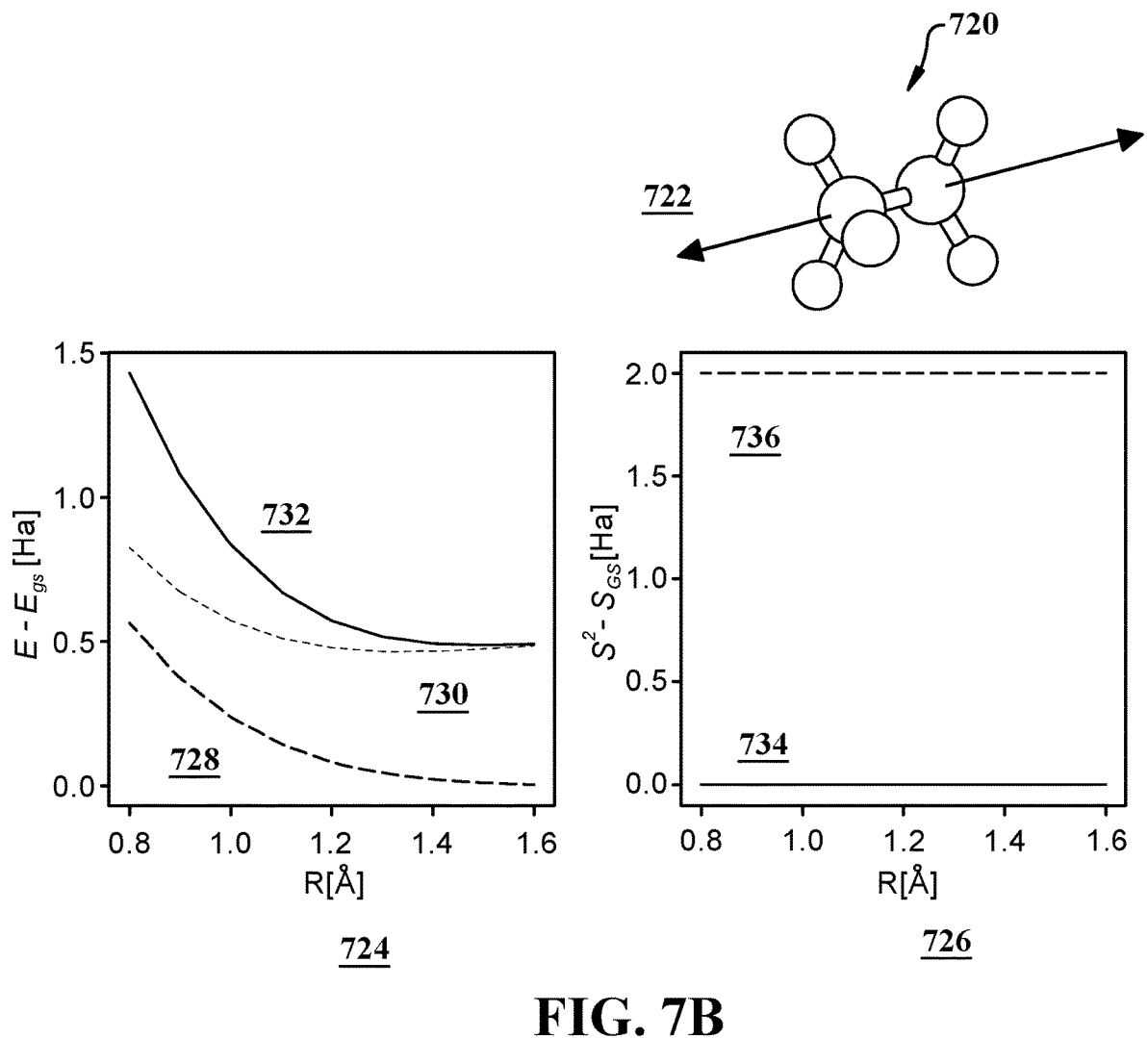
FIG. 7B illustrates an example of a numerical experiment relative to a molecule.

FIG. 7B illustrates an example of a numerical experiment relative to a molecule. The numerical experiments relative to $C_2H_6$ as shown in 722 with a HOMO-LUMO space is shown at 720. X-axis shown in graphs 724 and 726 shows distance between two carbon atoms. In the graph shown in 724, there are three curves represent energies of three electronically excited states as a function of bond length. Curve 728 is a lowest excited state and it slowly reaches zero state as the molecule is broken down further thus the lowest excited state is becoming energetically the same as ground state in comparison to 730 and 732. The graph depicted by 726 characterizes speed of excited state. Curves 730 and 732 in graph 724 are superimposed and thus result in a straight line in graph 726 wherein line 734 is constantly equal to zero so the two highest excited states remain in a singular channel and have same speed as ground state. Line 736 has a higher speed of 2 and that makes it a triplet. In this way, it can be precisely denoted on which state is lowest on graph 724 and which state is a triplet on graph 726. Along with excitation energies, excited-states properties are available, which allow identifying singlet and triplet states. Thus, the developed formalism and the numerical examples described above support feasibility of the two improvements to the qEOM algorithm wherein computational cost is reduced of the generalized eigenvalues synthesis relying on symbolic calculus and parallelization. Moreover, estimators of excited-states properties are developed considering constants of motion (e.g., spin) and non-constants of motion (e.g., dipoles, density matrices).

Figure 8:
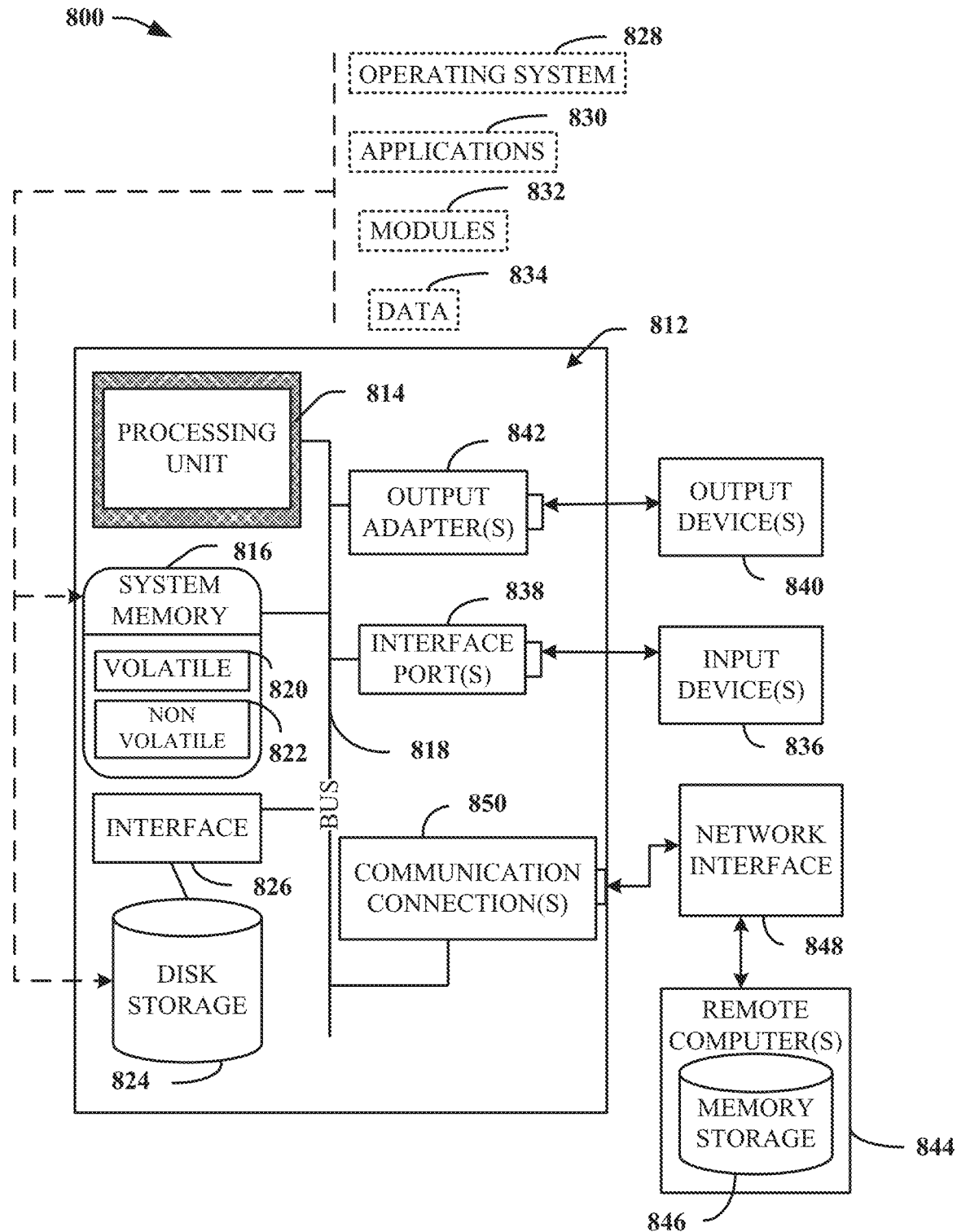
FIG. 8 illustrates a block diagram of an example, non-limiting, operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and non-volatile memory 822. The basic input/output system (BIOS), containing the basic routines to transfer information between elements within the computer 812, such as during start-up, is stored in non-volatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It is to be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
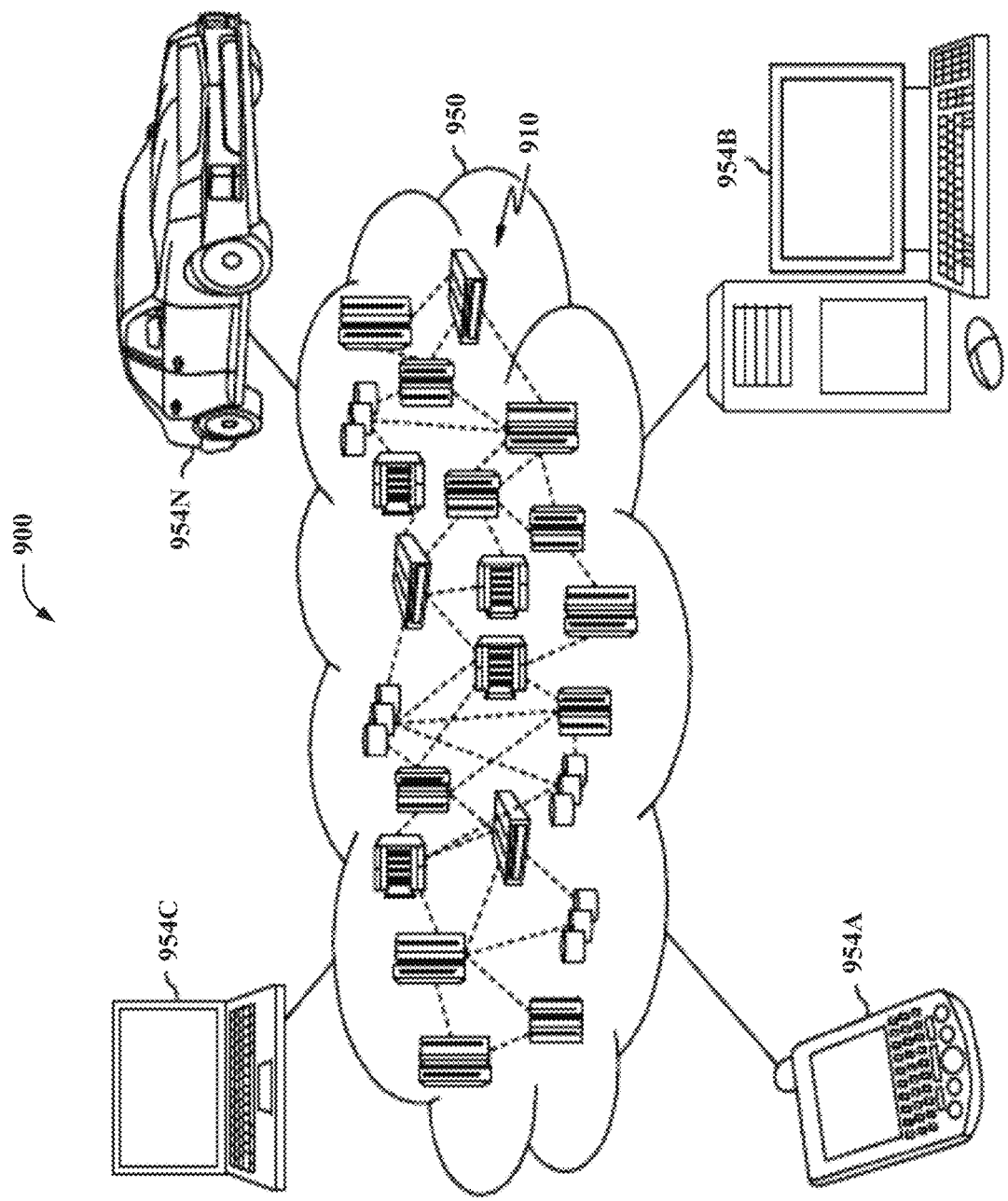
FIG. 9 illustrates a block diagram of an example, non-limiting, cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. It may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
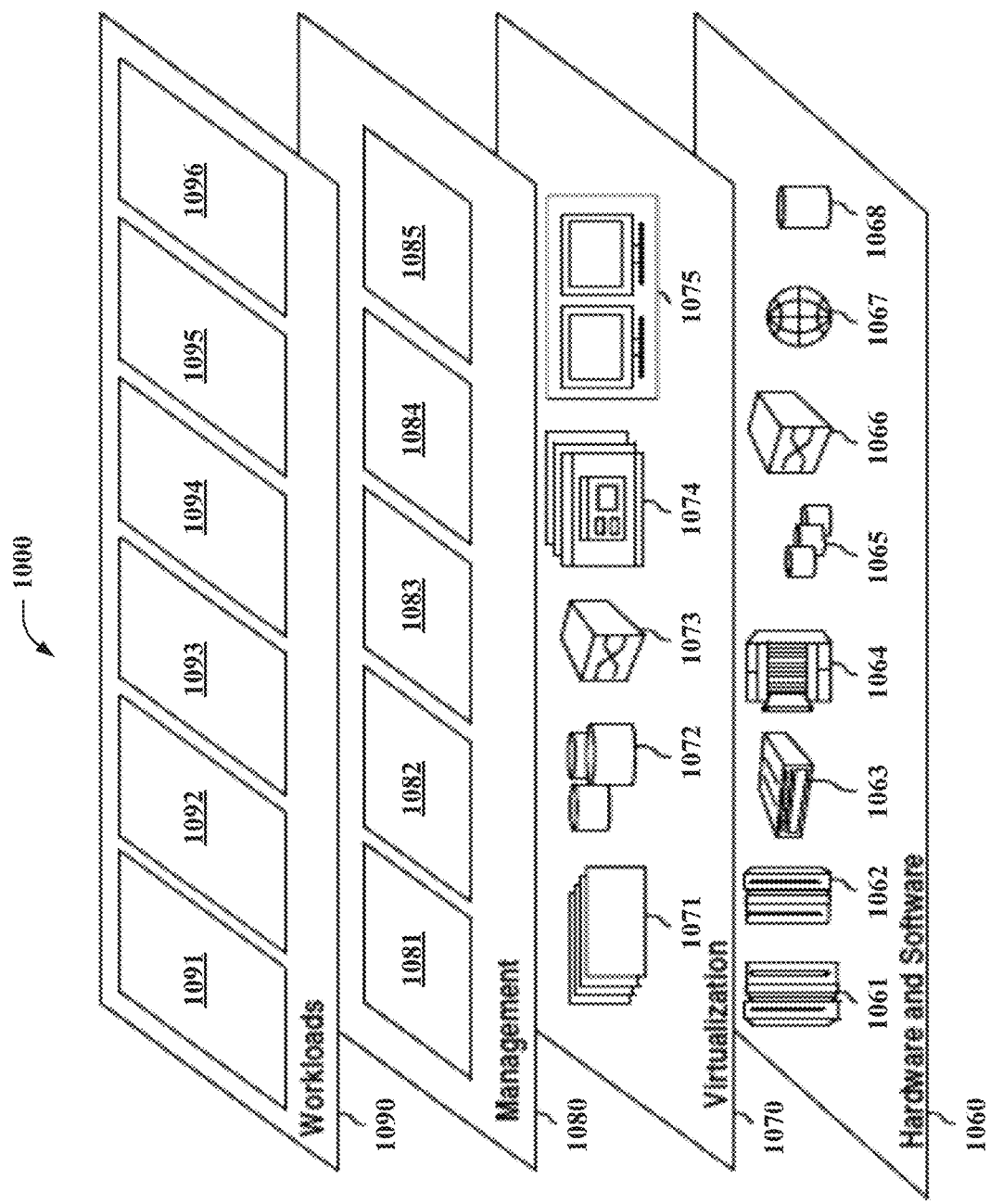
FIG. 10 illustrates a block diagram of example, non-limiting, abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067, quantum platform routing software 1068, and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum state preparation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a classical processor that executes the following computer executable components stored in memory, wherein the computer executable components comprise:
        a mapping component that maps Hamiltonian and pairs of excitation operators and respective adjoints to qubit operators to facilitate measurement on quantum hardware; and
        a computation component that computes matrix operators in terms of commutators between the qubit operators and the facilitated measurements on the quantum hardware, wherein the commutators are computed utilizing symbolic calculus.

2. The system of claim 1, wherein the mapping component maps the computed commutator onto a first qubit operator.

3. The system of claim 1, wherein the computation component computes the matrix operators to define matrices: M, Q, V and W that are parallelized across two or more computer processing units (CPUs).

4. The system of claim 1, wherein the computation component employs a class-based Python library to facilitate analytically computing the commutators.

5. The system of claim 4, wherein the computation component utilizes an operatorstring object corresponding to expression:

$$X = \gamma T_{i_{a_1} \ldots i_{a_k}} \hat{\phi}_{i_1} \ldots \hat{\phi}_{i_n}.$$

6. The system of claim 5, wherein the operatorstring is equipped with methods for multiplication, contraction of tensors T, Wick's decomposition $\hat{\varphi}_{i_1} \ldots \hat{\varphi}_{i_n} = N[\hat{\varphi}_{i_1} \ldots \hat{\varphi}_{i_n}] + \Sigma_{ik} N[\hat{\varphi}_{i_1} \ldots \overline{\hat{\varphi}_i \ldots \hat{\varphi}_j} \ldots \hat{\varphi}_{i_n}] + \Sigma_{ijkl} N[\hat{\varphi}_{i_1} \ldots \overline{\hat{\varphi}_i \ldots \hat{\varphi}_k \ldots \hat{\varphi}_j \ldots \hat{\varphi}_l} \ldots \hat{\varphi}_{i_n}] + \ldots$ wherein bars denote contraction and N denotes normal ordering and algebraic simplification.

7. The system of claim 1, wherein the computation component generates estimators of excited-state properties, considering constants of motion and non-constants of motion to facilitate quantitatively describing phenomena.

8. The system of claim 7, wherein the constants of motion comprise spin, and the non-constants of motion comprise at least one of: dipoles or density matrices.

9. The system of claim 7, wherein the computation component quantitatively describes at least one of the following phenomena: single-triplet excitations or electronic states of fragments in the dissociation of a molecule.

10. The system of claim 8, wherein the computation component generates estimators of constants of motion X, spin squared, wherein X is a constant of motion and c a string of vectors describing an excited state, then $$\begin{pmatrix} \tilde{M} & \tilde{Q} \\ \tilde{Q}^* & \tilde{M}^* \end{pmatrix} c = \Delta X \begin{pmatrix} V & W \\ -W^* & -V^* \end{pmatrix} c,$$

wherein $\tilde{M}_{ij} = \langle \psi | [E_i^+, X, E_j] | \psi \rangle$, $\tilde{Q}_{ij} = -\langle \psi | [E_i^+, X, E_j^+] | \psi \rangle$, $V_{ij} = \langle \psi | [E_i^+, E_j] | \psi \rangle$, $W_{ij} = -\langle \psi | [E_i^+, E_j^+] | \psi \rangle$, and wherein the computation component computes difference $\Delta X$ between a value taken by X on an excited state and on a ground state by evaluating additional matrix elements.

11. The system of claim 1, wherein the computation component diagnoses excited-state properties by quantifying physical properties of transition from a ground state to a target excited state.

12. The system of claim 10, wherein the computation component for observables X that are not constants of motion, transition and excited-states matrix elements are evaluated introducing additional quantum measurements of the form $\langle \Psi_i | X | \Psi_j \rangle = \langle \Psi_0 | E_i^+ X E_j | \Psi_0 \rangle = \Sigma_\mu c_\mu(X, \text{ij}) \langle \Psi_0 | P_\mu | \Psi_0 \rangle$.

13. The system of claim 12, wherein the computation component makes accessible transition and excited-state one-body density matrices and dipole moments.

14. The system of claim 10, wherein the computation component:
    (a) utilizes quantum hardware to measure matrices, V, W, M, Q, $\tilde{M}$, $\tilde{Q}$;
    (b) utilizes classical hardware to determine E, $\Delta X$, and c;
    (c) measures operators $E_j^+ E_j E_i^+ X E_j$, using quantum hardware; and
    (d) determines transition reduced density matrices (RDMs) and non-constants of motion (COMs) using classical hardware.

15. A computer-implemented method, comprising:
    mapping, using a mapping component, Hamiltonian and pairs of excitation operators and respective adjoints to qubit operators to facilitate measurement on quantum hardware; and
    computing, using a computation component, matrix operators in terms of commutators between the qubit operators and the facilitated measurements on the quantum hardware, wherein the commutators are computed utilizing symbolic calculus.

16. The method of claim 15, wherein the mapping comprises mapping the computed commutator onto a first qubit operator.

17. The method of claim 15, further comprising computing, using the computing component, the matrix operators to define matrices: M, Q, V and W that are parallelized across two or more computer processing units (CPUs).

18. The method of claim 15, further comprises employing, using the computation component, a class-based Python library to facilitate analytically computing the commutators.

19. The method of claim 18, further comprises utilizing, using the computation component, an operatorstring object corresponding to expression:

$$X = \gamma T_{i_{a_1} \ldots i_{a_k}} \hat{\phi}_{i_1} \ldots \hat{\phi}_{i_n},$$

wherein the operatorstring is equipped with methods for multiplication, contraction of tensors T, Wick's decomposition $\hat{\phi}_{i_1} \ldots \hat{\phi}_{i_n} = N[\hat{\phi}_{i_1} \ldots \hat{\phi}_{i_n}] + \Sigma_{ij} N[\hat{\phi}_{i_1} \ldots \hat{\phi}_i \ldots \hat{\phi}_j \ldots \hat{\phi}_{i_n}] + \Sigma_{ijkl} N[\hat{\phi}_{i_1} \ldots \hat{\phi}_i \ldots \hat{\phi}_k \ldots \hat{\phi}_j \ldots \hat{\phi}_l \ldots \hat{\phi}_{i_n}] + \ldots$ wherein bars denote contraction and N denotes normal ordering and algebraic simplification.

20. The method of claim 19, further comprising generating, using the computation component, estimators of constants of motion X, spin squared, wherein X is a constant of motion and c a string of vectors describing an excited state, then $$\begin{pmatrix} \tilde{M} & \tilde{Q} \\ \tilde{Q}^* & \tilde{M}^* \end{pmatrix} c = \Delta X \begin{pmatrix} V & W \\ -W^* & -V^* \end{pmatrix} c,$$

wherein $\tilde{M}_{ij} = \langle \psi | [E_i^+, X, E_j] | \psi \rangle$, $\tilde{Q}_{ij} = -\langle \psi | [E_i^+, X, E_j^+] | \psi \rangle$, $V_{ij} = \langle \psi | [E_i^+, E_j] | \psi \rangle$, $W_{ij} = -\langle \psi | [E_i^+, E_j^+] | \psi \rangle$, and wherein the computation component computes difference $\Delta X$ between a value employed by X on an excited state and on a ground state by evaluating additional matrix elements, and wherein the computation component for observables X that are not constants of motion, transition and excited-states matrix elements are evaluated introducing additional quantum measurements of the form $\langle \Psi_i | X | \Psi_j \rangle = \langle \Psi_0 | E_i^+ X E_j | \Psi_0 \rangle = \Sigma_\mu c_\mu(X, ij) \langle \Psi_0 | P_\mu | \Psi_0 \rangle$.

21. The method of claim 20, further comprises:
(a) utilizing quantum hardware to measure matrices, V, W, M, Q, $\tilde{M}$, $\tilde{Q}$;
(b) utilizing classical hardware to determine E, $\Delta X$, and c;
(c) measuring operators $E_i^+ E_j E_i^+ X E_j$, using quantum hardware; and
(d) determining transition reduced density matrices (RDMs) and non-constants of motion (COMs) using classical hardware.

22. A computer program product comprising a computer readable storage medium having program instructions embodied therewith, the program instructions executable by a classical processor to cause the classical processor to:

map Hamiltonian and pairs of excitation operators and respective adjoints to qubit operators to facilitate measurement on quantum hardware; and
compute matrix operators in terms of commutators between the qubit operators and the facilitated measurements on the quantum hardware, wherein the commutators are computed utilizing symbolic calculus.

23. The computer program product of claim 22, the program instructions further executable by a classical processor to cause the processor to:
(a) map the computed commutator onto a first qubit operator;
(b) compute the matrix operators to define matrices: M, Q, V and W that are parallelized across two or more computer processing units (CPUs);
(c) utilize an operatorstring object corresponding to expression:

$$X = \gamma T_{i_{a_1} \ldots i_{a_k}} \hat{\phi}_{i_1} \ldots \hat{\phi}_{i_n},$$

wherein the operatorstring is equipped with methods for multiplication, contraction of tensors T, Wick's decomposition $\hat{\phi}_{i_1} \ldots \hat{\phi}_{i_n} = N[\hat{\phi}_{i_1} \ldots \hat{\phi}_{i_n}] + \Sigma_{ij} N[\hat{\phi}_{i_1} \ldots \hat{\phi}_i \ldots \hat{\phi}_j \ldots \hat{\phi}_{i_n}] + \Sigma_{ijkl} N[\hat{\phi}_{i_1} \ldots \hat{\phi}_i \ldots \hat{\phi}_k \ldots \hat{\phi}_j \ldots \hat{\phi}_l \ldots \hat{\phi}_{i_n}] + \ldots$ wherein bars denote contraction and N denotes normal ordering and algebraic simplification;
(d) generate estimators of constants of motion X, spin squared, wherein X is a constant of motion and c a string of vectors describing an excited state, then $$\begin{pmatrix} \tilde{M} & \tilde{Q} \\ \tilde{Q}^* & \tilde{M}^* \end{pmatrix} c = \Delta X \begin{pmatrix} V & W \\ -W^* & -V^* \end{pmatrix} c,$$

wherein $\tilde{M}_{ij} = \langle \psi | [E_i^+, X, E_j] | \psi \rangle$, $\tilde{Q}_{ij} = -\langle \psi | [E_i^+, X, E_j^+] | \psi \rangle$, $V_{ij} = \langle \psi | [E_i^+, E_j] | \psi \rangle$, $W_{ij} = -\langle \psi | [E_i^+, E_j^+] | \psi \rangle$, and wherein the computation component computes difference $\Delta X$ between a value employed by X on an excited state and on a ground state by evaluating additional matrix elements, and for observables X that are not constants of motion, transition and excited-states matrix elements are evaluated introducing additional quantum measurements of the form $\langle \Psi_i | X | \Psi_j \rangle = \langle \Psi_0 | E_i^+ X E_j | \Psi_0 \rangle = \Sigma_\mu c_\mu(X, ij) \langle \Psi_0 | P_\mu | \Psi_0 \rangle$.

* * * * *